US011978297B2

(12) United States Patent
Horita et al.

(10) Patent No.: US 11,978,297 B2
(45) Date of Patent: May 7, 2024

(54) MONEY HANDLING MACHINE AND MONEY HANDLING METHOD

(71) Applicant: Glory Ltd., Himeji (JP)

(72) Inventors: Risa Horita, Himeji (JP); Kouichi Nabeyama, Himeji (JP)

(73) Assignee: GLORY LTD., Himeji (JP)

( * ) Notice: Subject to any disclaimer, the term of this patent is extended or adjusted under 35 U.S.C. 154(b) by 0 days.

(21) Appl. No.: 17/847,179

(22) Filed: Jun. 23, 2022

(65) Prior Publication Data

US 2022/0415110 A1 Dec. 29, 2022

(30) Foreign Application Priority Data

Jun. 24, 2021 (JP) ................................ 2021-105162

(51) Int. Cl.

| | |
|---|---|
| ***G07D 3/14*** | (2006.01) |
| ***G07D 9/00*** | (2006.01) |
| ***G07D 11/22*** | (2019.01) |
| ***G07D 11/40*** | (2019.01) |

(52) U.S. Cl.

CPC ............... *G07D 3/14* (2013.01); *G07D 9/002* (2013.01); *G07D 11/22* (2019.01); *G07D 11/40* (2019.01)

(58) Field of Classification Search

CPC ................................ G07D 3/14; G07D 11/40

See application file for complete search history.

(56) References Cited

U.S. PATENT DOCUMENTS

| | | | | |
|---|---|---|---|---|
| 6,311,819 | B1 * | 11/2001 | Stromme | G07D 7/003 194/207 |
| 2020/0175801 | A1 | 6/2020 | Nada | |
| 2020/0372745 | A1 * | 11/2020 | Onishi | G07D 9/008 |
| 2021/0056794 | A1 * | 2/2021 | Nakamoto | G07D 11/60 |
| 2021/0125449 | A1 | 4/2021 | Fukuda et al. | |
| 2021/0134102 | A1 | 5/2021 | Chen et al. | |

FOREIGN PATENT DOCUMENTS

| | | |
|---|---|---|
| JP | 2018-022241 A | 2/2018 |
| JP | 2019-36004 A | 3/2019 |

* cited by examiner

*Primary Examiner* — Jacob S. Scott
*Assistant Examiner* — Miraj T. Patel
(74) *Attorney, Agent, or Firm* — XSENSUS LLP

(57) ABSTRACT

A money handling method to be executed by a money handling machine including a body and an extension unit. The method includes: instructing the extension unit to replenish the body with money with a specified denomination; replenishing the body from the extension unit in accordance with the instruction; recognizing a denomination of each of the money sent from the extension unit; storing the money in a first storage unit associated with a first denomination in a first case where the denomination recognized is the first denomination identical to the specified denomination; storing money in a second storage unit in a second case where the denomination recognized is a second denomination different from the specified denomination; and continuing the replenishment with the money using the extension unit as instructed in both the first case and the second case.

19 Claims, 9 Drawing Sheets

MONEY HANDLING MACHINE AND MONEY HANDLING METHOD

CROSS-REFERENCE TO RELATED APPLICATION

This application claims priority to Japanese Patent Application No. 2021-105162 filed on Jun. 24, 2021, the entire disclosure of which is incorporated herein by reference.

BACKGROUND

A conventional money handling machine includes a plurality of storage units. The storage units store money of respective denominations. The denomination of the money stored in each storage unit is determined in advance. Clerks manually replenish the storage units with money. One of the storage units may thus be replenished with money of a denomination different from the one that has been originally assigned to the storage unit.

The conventional money handling machine recognizes the denomination of the money stored in each storage unit, and displays an error on a display, if money with a denomination different from that assigned to the storage unit is stored in the storage unit. At the occurrence of an error, the conventional money handling machine stops handling. The conventional money handling machine is capable of taking out money of an incorrect denomination to the outside of the machine.

SUMMARY

The technique disclosed herein relates to a money handling method to be executed by a money handling machine including a body, and an extension unit connected to the body and configured to store money to be used to replenish the body depending on denominations. The money handling method includes: instructing the extension unit to replenish the body with money with a specified denomination; replenishing the body with the money from the extension unit in accordance with the instruction; recognizing a denomination of each of the money sent to the body; storing the money in a first storage associated with a first denomination in a first case where the denomination recognized is the first denomination identical to the specified denomination; storing the money in a second storage in a second case where the denomination recognized is a second denomination different from the specified denomination; and continuing the replenishment with the money using the extension unit as instructed in both the first case and the second case.

DETAILED DESCRIPTION

Figure 1:
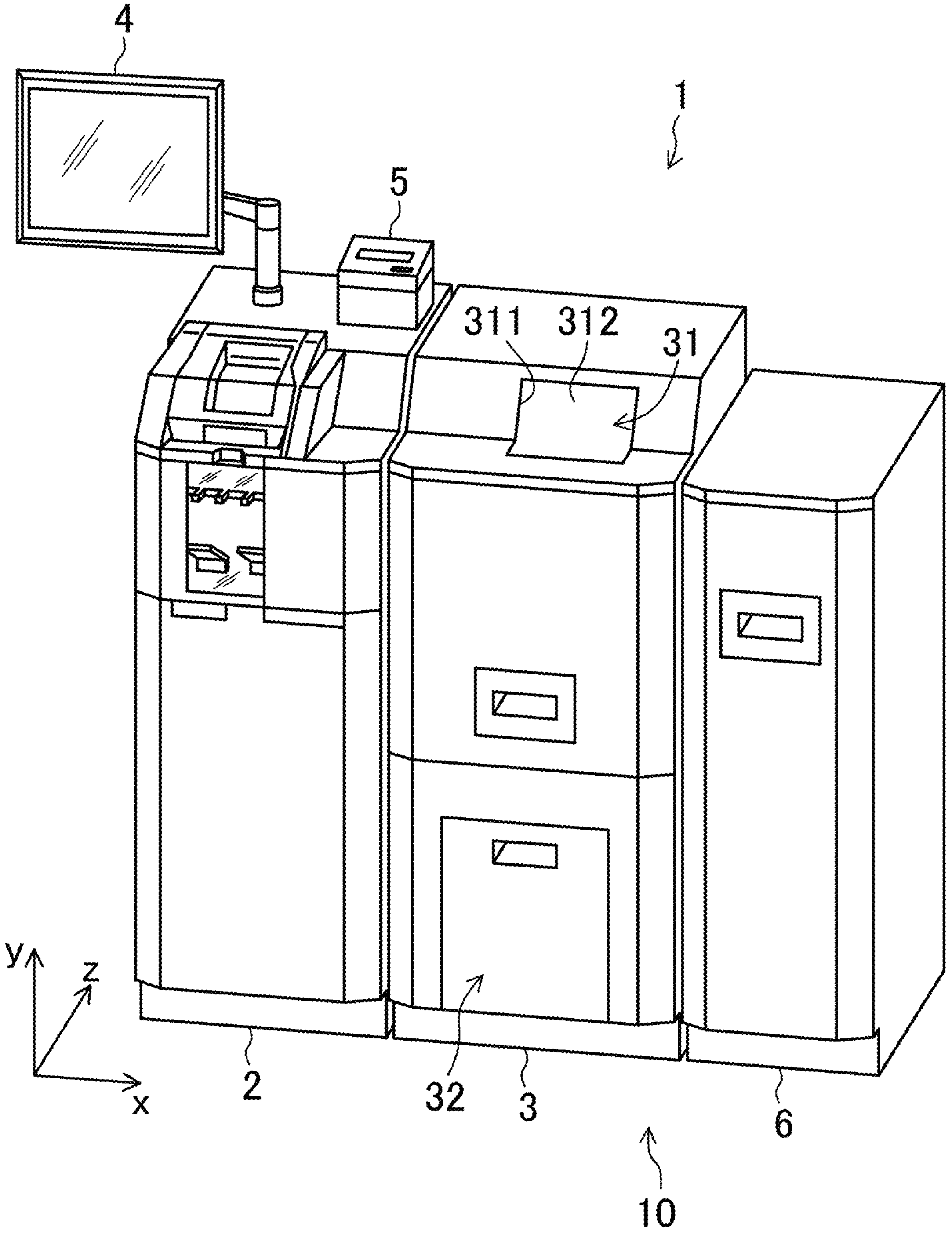
FIG. 1 is a perspective view of a money handling machine.

Unfortunately, the conventional money handling machine is not capable of continuing handling at the occurrence of an error related to a denomination.

The technique disclosed herein makes it possible to continue handling money even at the occurrence of an error related to a denomination.

The technique disclosed herein relates to a money handling method to be executed by a money handling machine including a body, and an extension unit connected to the body and configured to store money to be used to replenish the body depending on denominations. The money handling method includes: instructing the extension unit to replenish the body with money with a specified denomination; replenishing the body with the money from the extension unit in accordance with the instruction; recognizing a denomination of each of the money sent to the body; storing the money in a first storage unit associated with a first denomination in a first case where the denomination recognized is the first denomination identical to the specified denomination; storing the money in a second storage unit in a second case where the denomination recognized is a second denomination different from the specified denomination; and continuing the replenishment with the money using the extension unit as instructed in both the first case and the second case.

According to this money handling method, the money handling machine continues the replenishment processing, even if money with a denomination different from that specified for the replenishment has been sent from the extension unit to the body.

The second storage unit may be associated with the second denomination.

The money handling machine is capable of storing money with an incorrect denomination in a storage unit associated with the corresponding denomination.

In the second case, the money may be stored in a third storage unit, if there is no storage unit associated with the second denomination or no space in the second storage unit.

The money handling machine does not take out the money with the incorrect denomination to the outside of the machine.

In the second case, a notification may be performed using a notifier.

Assume that the storage unit of the extension unit stores money with an incorrect denomination. In this case, the notifier issues notification so that an administrator corrects the error.

It is also possible to issue notification of information on a storage unit storing the money with the second denomination in the extension unit using the notifier.

The administrator can quickly correct an error based on the information on the storage unit as notified.

In the second case, the replenishment from the extension unit may be stopped if a specific condition is satisfied.

Since the replenishment stops depending on the condition, the money handling machine is operated flexibly.

The above-mentioned specific condition may be the presetting in which a stop of the replenishment in the second case is set.

The administrator may freely predetermine whether to stop or continue the replenishment.

If the replenishment with the money is executed in response to an instruction by an operator, the replenishment may be stopped. If the replenishment with the money is automatically executed based on a preset schedule, the replenishment is continued.

If an operator manually issues instruction on replenishment with money, the operator is assumed to be near the money handling machine. By stopping the replenishment, an operator, for example, can check the storage units of the extension unit. If the replenishment with money is executed automatically, there is not necessarily a person, more specifically, a person who is capable of checking the storage unit of the extension unit, near the money handling machine. In this case, the money handling machine continues the replenishment and takes out no money to the outside of the machine. As a result, the money is managed properly.

If the operator is an authorized person for the money stored in the extension unit, the replenishment may be stopped. If the operator is not the authorized person, the replenishment may be continued.

The authorized person can check each storage unit of the extension unit. If the operator is identical to the authorized person, the operator can check the storage unit of the extension unit by stopping the replenishment. If the operator is not identical to the authorized person, the operator cannot check the storage unit of the extension unit. In this case, the money handling machine continues the replenishment and takes out no money to the outside of the machine. As a result, the money is managed properly.

At a stop of the replenishment, it is also possible to store the money sent from the extension unit in a storage unit different from the first storage unit and the second storage unit.

The money handling machine is capable of managing money related to the stopped replenishment processing separately.

After stopping the replenishment, it is also possible to instruct the extension unit to replenish the body with money with a next denomination.

If the replenishment is performed with each money with its corresponding denomination, the money handling machine is capable of executing the replenishment with money with the next denomination, even at a stop of the replenishment with money with a different denomination.

In the above-mentioned second case, it is also possible to cause an operator to select to continue or stop the replenishment. Further, it is also possible to store the money in the second storage unit and continue the replenishment by the extension unit as instructed, if the operator selects to continue the replenishment. Furthermore, it is also possible to stop the replenishment from the extension unit, if the operator selects to stop the replenishment.

The money handling machine is switchable between continuation and stop of replenishment as selected by the operator upon finding an incorrect denomination.

It is also possible to display a selection screen using the display unit in the second case.

The operator is capable of easily selecting to continue or stop the replenishment.

The technique disclosed herein relates to a money handling machine. This money handling machine includes: at least a first storage unit and a second storage unit that store money with respective denominations; a connector connected to an extension unit including storage units for storing money with respective denominations; a deposit unit that receives money used for replenishment from the extension unit; a recognition unit that recognizes a denomination of each of the money sent from the extension unit; a control unit that sends, to the extension unit, an instruction on replenishment with money of a specified denomination, and causes the first storage unit or the second storage unit to store the money depending on the denomination recognized by the recognition unit. The control unit causes the first storage unit associated with a first denomination to store money in a first case where the denomination recognized is the first denomination identical to the specified denomination. The control unit causes the second storage unit to store money in a second case where the denomination recognized is a second denomination different from the specified denomination. The control unit continues the replenishment with the money by the extension unit as instructed in both the first case and the second case.

With this configuration, the money handling machine continues the replenishment processing, even if money with a denomination different from that specified for the replenishment has been sent from the extension unit.

A notifier that notifies of information may be connected to the money handling machine. The control unit may cause the notifier to make a notification in the second case.

Now, an embodiment of the money handling machine and the money handling method will be described with reference to the drawings. The money handling machine and the money handling method described herein are exemplary.

(First Exemplary Configuration)

Figure 9:
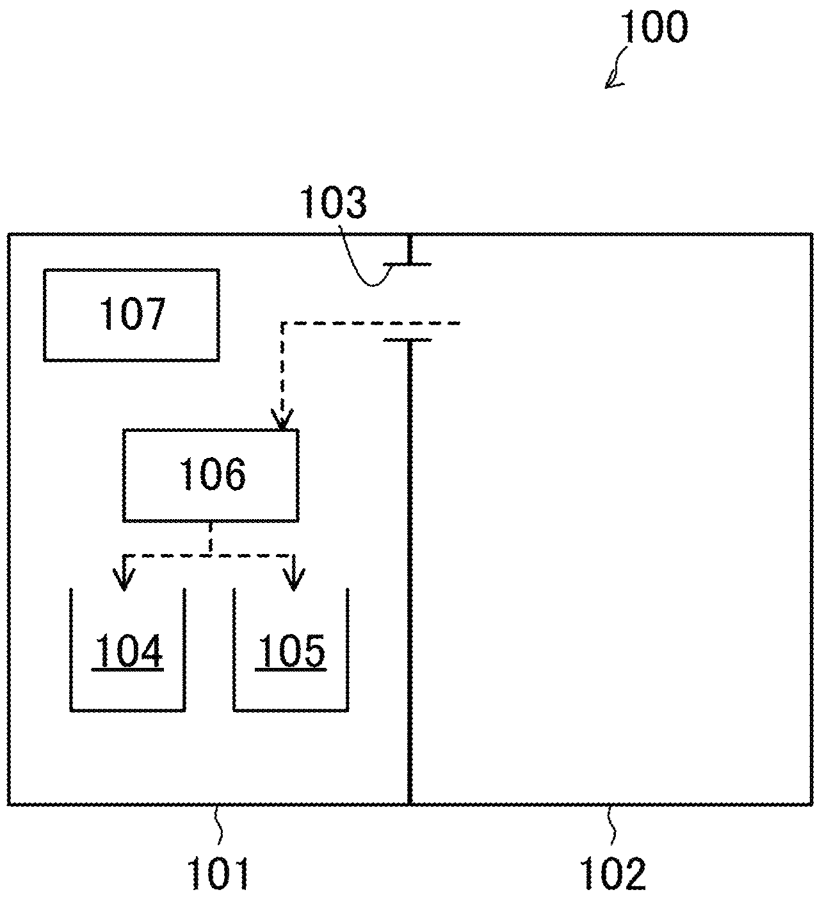
FIG. 9 illustrates a configuration of the money handling machine.

FIG. 9 illustrates an exemplary configuration of a money handling machine 100. The money handling machine 100 includes a body 101 and an extension unit 102. The extension unit 102 stores money used to replenish the body 101 depending on denominations.

The body 101 includes a connector 103 to be connected to the extension unit 102. The money sent from the extension unit 102 passes through the connector 103 and enters the body 101, as indicated by a broken arrow in FIG. 9.

The body 101 includes a first storage unit 104 and a second storage unit 105. Each of the first and second storage units 104 and 105 stores money. The body 101 also includes a recognition unit 106. The recognition unit 106 recognizes the denomination of each of the money sent from the extension unit 102.

The body 101 also includes a control unit 107. The control unit 107 sends, to the extension unit 102, an instruction on replenishment with money with a specified denomination. The control unit 107 causes the first and second storage units 104 and 105 to store money based on the recognition by the recognition unit 106.

Specifically, the control unit 107 causes the first storage unit 104 associated with a first denomination to store money in a first case where the recognized denomination is the first denomination identical to the specified denomination. On the other hand, in a second case where the recognized denomination is a second denomination, which is different from that specified, the control unit 107 causes the second storage unit 105 to store the money. In both the first and second cases, the control unit 107 continues the replenishment with the money by the extension unit 102 as instructed.

Even if the denomination of the money used to replenish the body 101 from the extension unit 102 is different from that specified for the replenishment, the money handling machine 100 continues the replenishment processing.

(Second Exemplary Configuration)

FIG. 1 illustrates an appearance of a cash handling machine 1. The cash handling machine 1 is used in a cash management system. The cash management system is for managing the money received by a store clerk(s) from a customer(s) and the money given by a store clerk(s) to a customer(s) in a store. The cash management system includes a first cash handling machine 1 in a back office, and a second cash handling machine in a store and connected to a point of sales (POS). The second cash handling machine deposits the money paid by a customer(s). The second cash handling machine dispenses change to be given to a customer(s).

The first cash handling machine 1 includes a money handling machine 10 as will be described later. The money handling machine 10 is a variation of the money handling machine 100 in FIG. 9.

Figure 2:
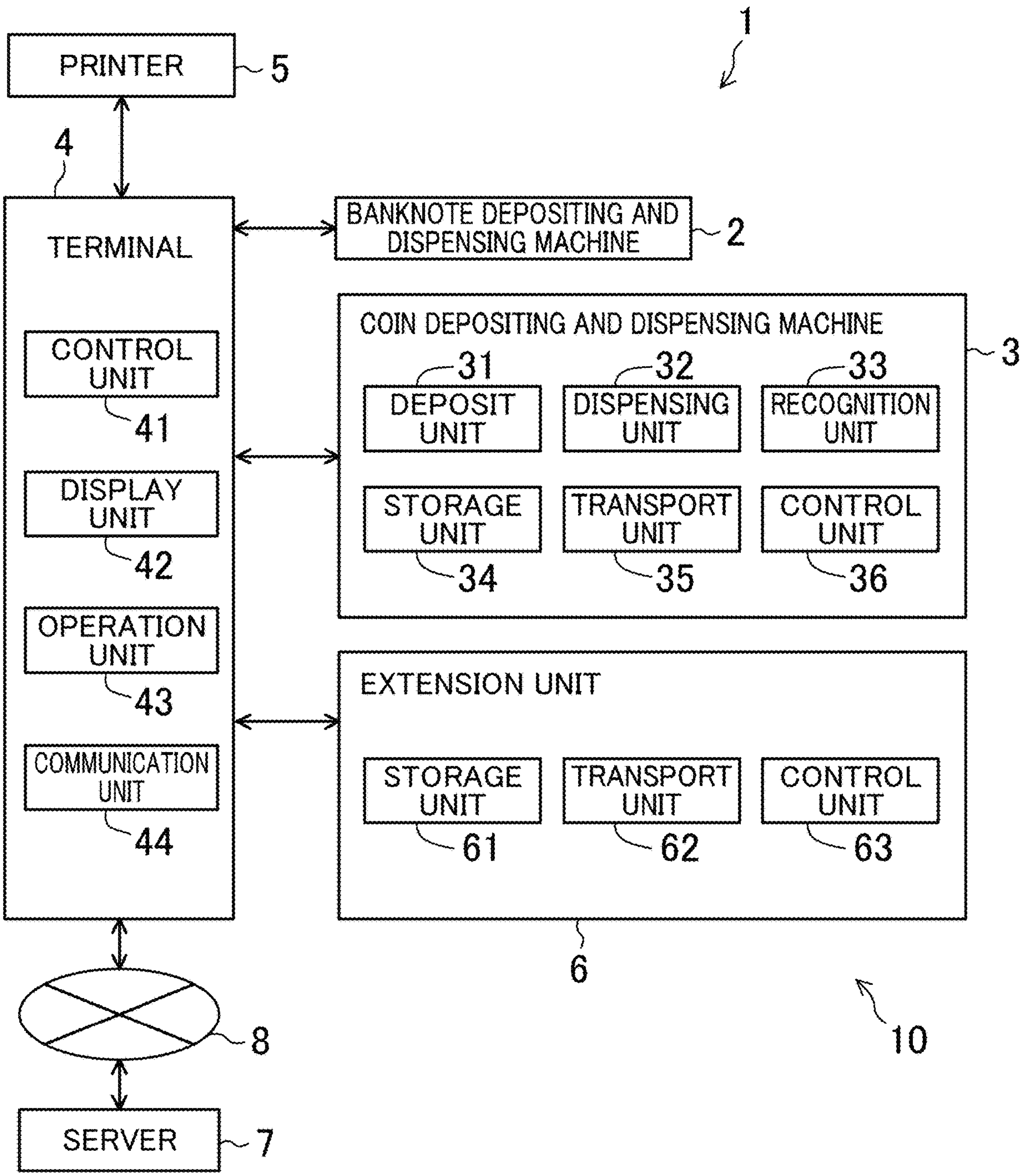
FIG. 2 is a block diagram of the money handling machine.

The first cash handling machine 1 dispenses a change fund for charging the second cash handling machine. The first cash handling machine 1 also deposits proceeds from sales collected from the second cash handling machine. As shown in FIGS. 1 and 2, the first cash handling machine 1 includes a coin depositing and dispensing machine 3, a terminal 4, and an extension unit 6. The first cash handling machine 1 may further include a banknote depositing and dispensing machine 2 and a printer 5. The banknote depositing and dispensing machine 2 performs depositing and dispensing processing of banknotes. The printer 5 may be a thermal transfer printer or an inkjet printer, for example. The coin depositing and dispensing machine 3 and the extension unit 6 are arranged in an X-direction. The X-direction corresponds to the right-left direction when the cash handling machine 1 faces the front. The Y-direction corresponds to the height direction of the cash handling machine 1. The Z-direction corresponds to the front-rear direction or the depth direction of the cash handling machine 1.

The terminal 4 controls the entire first cash handling machine 1. The terminal 4 includes a control unit 41, a display unit 42, an operation unit 43, and a communication unit 44. The display unit 42 displays various kinds of information to an operator. The display unit 42 may be a flat panel display, for example. The operation unit 43 receives an operation by an operator. The terminal 4 may include a touch panel. The touch panel includes the display unit 42 and the operation unit 43 that are integral with each other. In addition to controlling the terminal 4, the control unit 41 performs communications with each device communicably connected thereto. In the example of this embodiment, the control unit 41 outputs control signals to the banknote depositing and dispensing machine 2, the coin depositing and dispensing machine 3, the printer 5, and the extension unit 6. In addition, the control unit 41 receives signals from the banknote depositing and dispensing machine 2, the coin depositing and dispensing machine 3, the printer 5, and the extension unit 6. The control unit 41 may include a central processing unit (CPU), a memory, and an input/output (I/O) circuit. The CPU executes programs. The memory stores the programs and data for operating the first cash handling machine 1. The memory is, for example, a random access memory (RAM) and/or a read only memory (ROM). The I/O circuit performs input and output of electrical signals between the control unit 41 and each device connected to the control unit 41.

The terminal 4 is connected to a server 7 via a network 8. The network 8 is a wide and/or local area network(s). The server 7 remotely controls the cash handling machine 1. The communication unit 44 performs communications through the network 8.

The coin depositing and dispensing machine 3 performs depositing and dispensing processing of loose coins. As shown in FIG. 2, the coin depositing and dispensing machine 3 includes a deposit unit 31, a dispensing unit 32, a recognition unit 33, a storage unit 34, a transport unit 35, and a control unit 36. The control unit 36 may include a CPU, a memory, and an t/O circuit. The CPU executes programs. The memory stores the programs and data for operating the coin depositing and dispensing machine 3. The memory is a RAM or ROM, for example. The I/O circuit performs input and output of electrical signals between the control unit 36 and each device connected to the control unit 36.

In the technique disclosed herein, the coin depositing and dispensing machine 3 and the terminal 4 constitute the body of the money handling machine 10. The coin depositing and dispensing machine 3 may include a part of functions of the terminal 4.

Figure 3:
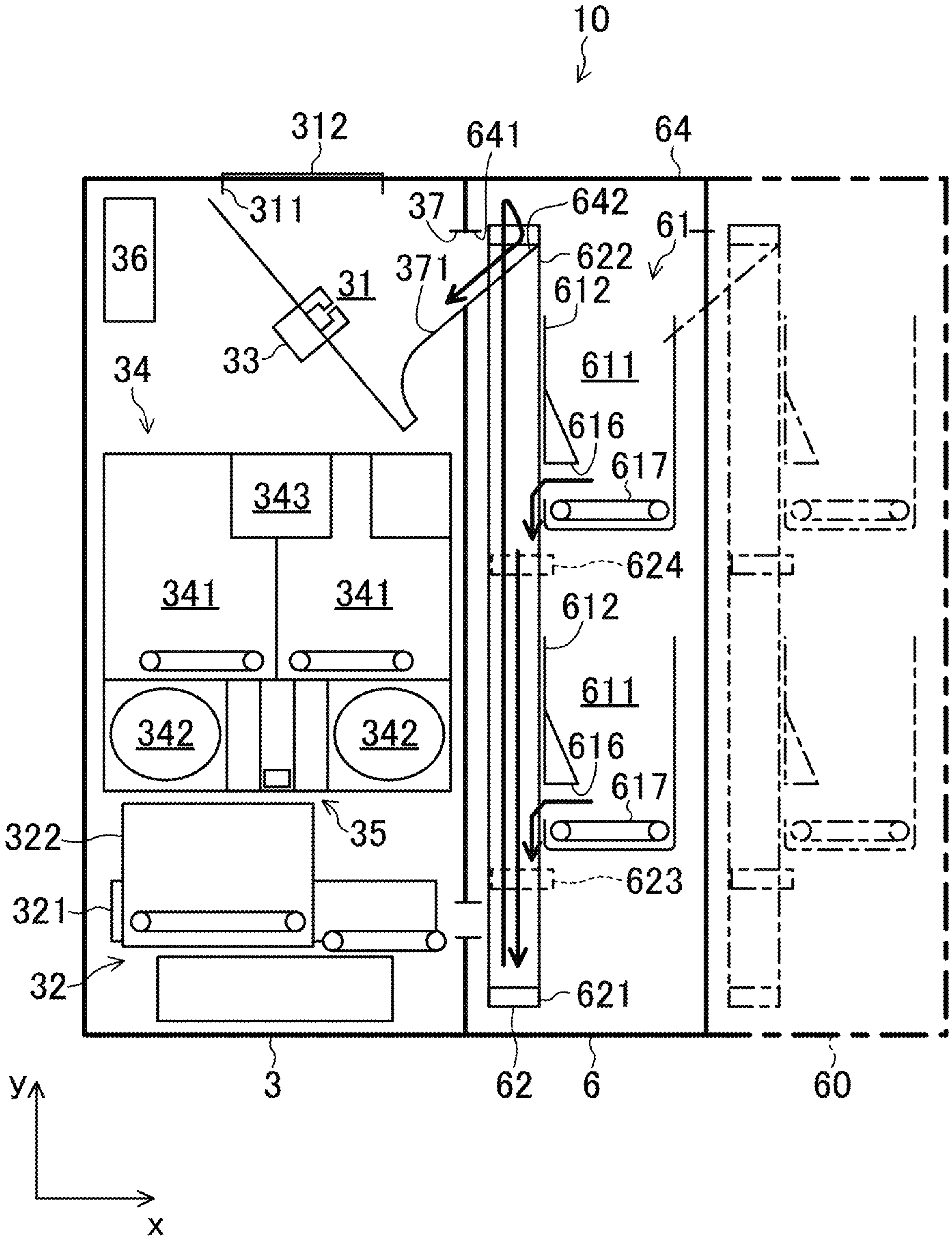
FIG. 3 illustrates an internal configuration of a body and an extension unit of a coin handling machine.

FIG. 3 illustrates a configuration of the coin depositing and dispensing machine 3. The transport unit 35 transports coins inside the coin depositing and dispensing machine 3.

The deposit unit 31 has an inlet 311. The inlet 311 is open in the upper surface of the housing of the coin depositing and dispensing machine 3. A shutter 312 opens the inlet 311 in the depositing processing, for example. An operator inserts coins to be deposited, into the deposit unit 31 through the inlet 311 in the deposit processing. The deposit unit 31 feeds out the inserted coins one by one. The transport unit 35 transports the coins to the recognition unit 33.

The recognition unit 33 recognizes coins. The recognition unit 33 recognizes at least the denominations of the coins. The recognition unit 33 may recognize the authenticity and/or fitness of the coins, for example.

The storage unit 34 is located at the downstream end of the recognition unit 33 in the coin transport path. The storage unit 34 stores the coins recognized by the recognition unit 33. The storage unit 34 includes a plurality of stackers 341. The stackers 341 store coins for respective denominations, for example. The coins inserted into the deposit unit 31 in the depositing processing are stored in the stackers 341 for the respective denominations. The denominations stored in the stackers 341 are assigned in advance.

The storage unit 34 includes a feeding mechanism 342 for each stacker 341. The feeding mechanism 342 feeds the coins stored in the stacker 341 in the dispensing processing, for example. The storage unit 34 feeds the coins for the respective denominations.

The storage unit 34 also includes an overflow storage 343. The overflow storage 343 stores the coins not or unable to be stored in any of the stackers 341.

The dispensing unit 32 is located below the storage unit 34. The dispensing unit 32 is detachably attached with a drawer 321. The drawer 321 may be attached to a POS register in a store, for example. The drawer 321 stores coins depending on denominations. The coins fed by the storage unit 34 for each denomination are inserted into the drawer 321 for the denomination as a change fund. In the dispensing processing, an operator takes the drawer 321 with the inserted coins out of the dispensing unit 32.

The dispensing unit 32 is also be attachable with a coin cassette 322. The coin cassette 322 is detachable from the dispensing unit 32. The transport unit 35 selectively transports the coins fed by the storage unit 34 to the drawer 321 or the coin cassette 322.

(Configuration of Extension Unit)

The first cash handling machine 1 may also include the extension unit 6. The extension unit 6 replenishes the coin depositing and dispensing machine 3 with coins. As exemplarily illustrated in FIG. 1, the extension unit 6 is arranged in parallel with the coin depositing and dispensing machine 3 in the X-direction. The coin depositing and dispensing machine 3, the terminal 4, and the extension unit 6 constitute the money handling machine for handling money. The body including the coin depositing and dispensing machine 3 and the terminal 4 may be referred to as the "money handling machine". Alternatively, the coin depositing and dispensing machine 3 alone may be referred to as the "money handling machine".

Figure 4:
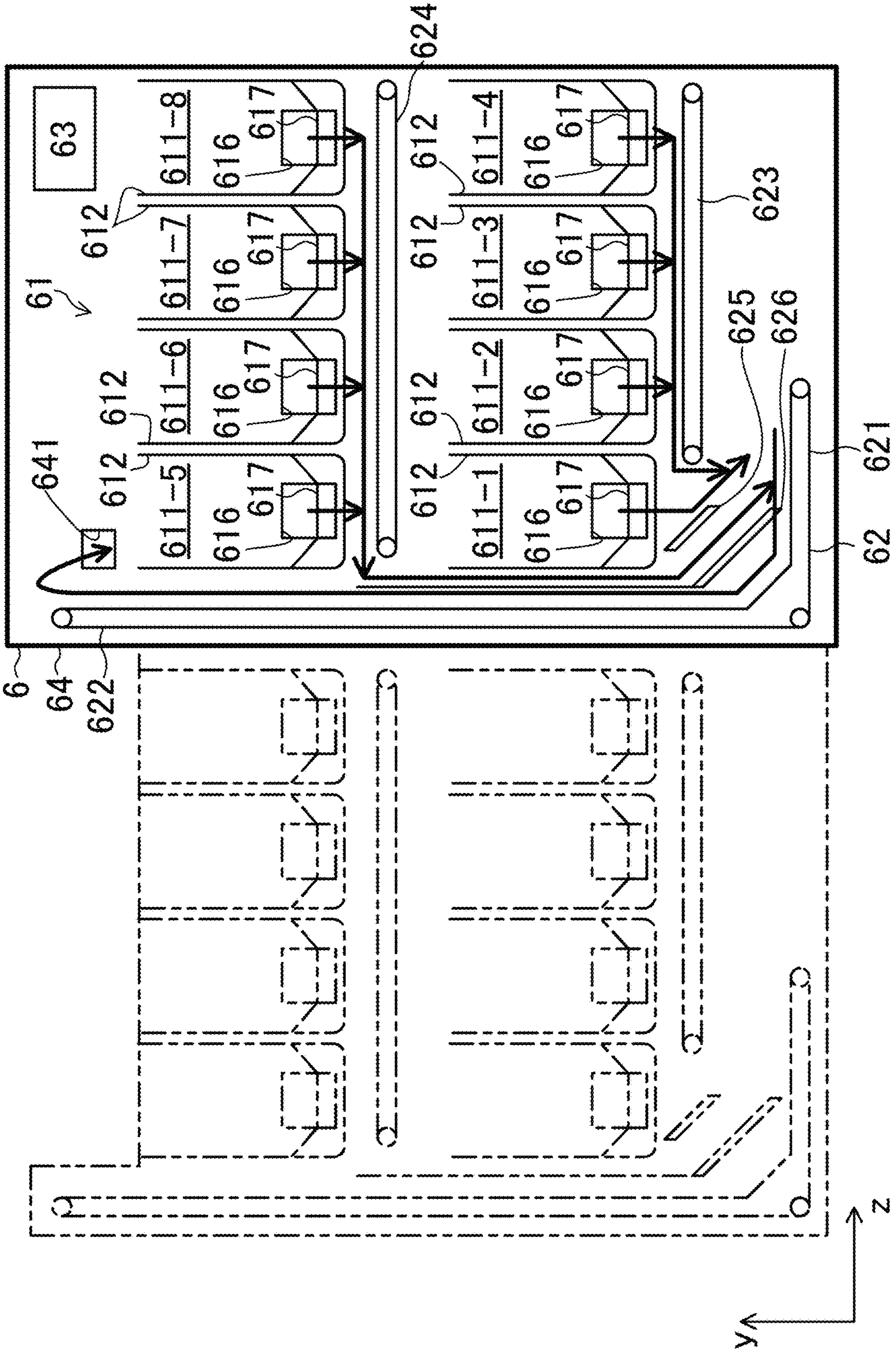
FIG. 4 illustrates an internal configuration of the extension unit.

As shown in FIG. 2, the extension unit 6 includes a storage unit 61, a transport unit 62, and a control unit 63. As shown in FIGS. 3 and 4, the storage unit 61, the transport unit 62, and the control unit 63 are housed in a housing 64.

The storage unit 61 includes a plurality of containers 611. Each container 611 stores coins. In the exemplary configuration of FIG. 4, the storage unit 61 includes eight containers 611, namely, first, second, third, fourth, fifth, sixth, seventh, and eighth containers. The eight containers 611 store coins for respective denominations. In the following description, the containers will be collectively referred to using reference character 611. The first, second, third, fourth, fifth, sixth, seventh, and eighth containers will be distinguished with branch numbers added to the reference character 611.

The first, second, third, and fourth containers 611-1, 611-2, 611-3, and 611-4 are arranged in this order from the front to the rear in the Z-direction. The fifth, sixth, seventh, and eighth containers 611-5, 611-6, 611-7, and 611-8 are arranged in this order from the front to the rear in the Z-direction above the first, second, third, and fourth containers 611-1, 611-2, 611-3, and 611-4, respectively.

Each container 611 has an upper end open upward. This opening serves as an inlet 612 for receiving coins. As will be described later, in order to charge each container 611 with money, the operator draws the container 611 to the outside of the housing 64, and directly inserts coins into the container 611 through the inlet 612.

Each container 611 has an outlet 616 at its bottom. In the exemplary configuration of FIGS. 3 and 4, the outlet 616 is open horizontally on a side of the bottom of the container 611. Each container 611 also includes a feeding unit 617 at its bottom. The feeding unit 617 is a belt wound between two rollers. With a rotation of the rollers, the belt runs to transport coins. The coins transported by the belt are ejected to the outside of the container 611 through the outlet 616.

The transport unit 62 includes a first horizontal transporter 621 at the bottom of the housing 64, a vertical transporter 622 at the front, a second horizontal transporter 623, and a third horizontal transporter 624. The transport unit 62 is a belt wound among a plurality of rollers. The first horizontal transporter 621 and the vertical transporter 622 are configured by one belt. This belt is attached with a plurality of engagers to engage with coins, at intervals. That is, the coins engage with the engagers.

The second horizontal transporter 623 extends in the Z-direction below the second, third, and fourth containers 611-2, 611-3, and 611-4 in the lower stage. The second horizontal transporter 623 is not located below the first container 611-1. The second horizontal transporter 623 is located on sides of and below the outlets 616 of these containers 611. The coins ejected through the outlets 616 of the second, third, and fourth containers 611-2, 611-3, and 611-4 to the outside of these containers 611 are put on the second horizontal transporter 623. Once the belt runs with a rotation of the rollers, the second horizontal transporter 623 transports the coins on the belt toward the front of the housing 64.

The third horizontal transporter 624 extends in the front-rear direction below the fifth, sixth, seventh, and eighth containers 611-5, 611-6, 611-7, and 611-8. The third horizontal transporter 624 is located on sides of and below the outlets 616 of these containers 611. The coins ejected through the outlets 616 of the fifth, sixth, seventh, and eighth containers 611-5, 611-6, 611-7, and 611-8 to the outside of these containers 611 are put on the third horizontal transporter 624. Once the belt runs with a rotation of the rollers, the third horizontal transporter 624 transports the coins on the belt toward the front of the housing 64.

The first horizontal transporter 621 extends in the front-rear direction at the bottom of the housing 64. The first horizontal transporter 621 is located below the first container 611-1, and partially overlaps the second and third horizontal transporters 623 and 624 in the vertical direction.

The coins transported forward by the second horizontal transporter 623 drops from the front end of the second horizontal transporter 623 onto the first horizontal transporter 621. Similarly, the coins transported forward by the third horizontal transporter 624 drops from the front end of the third horizontal transporter 624 onto the first horizontal transporter 621.

The coins ejected through the outlet 616 of the first container 611-1 to the outside of the first container 611-1 are put on the first horizontal transporter 621. Once the belt runs with a rotation of the rollers, the first horizontal transporter 621 transports the coins on the belt toward the front of the housing 64.

The vertical transporter 622 extends in the up-down direction at the front inside the housing 64. The vertical transporter 622 transports the coins toward the top in the housing 64.

Here, the belt running direction transits from horizontal to vertical between the first horizontal and vertical transporters 621 and 622. In the transition area, the present inventor(s) has/have found the following. When the coins are put on the belt, the coins ejected from each container 611 may stand and, in this state, roll and idle with respect to the belt, failing to engaging with the engagers of the belt.

To address the problem, as exemplarily illustrated in FIG. 4, the transport unit 62 includes a first chute 625 and a second chute 626. The first chute 625 is located below the outlet 616 of the first container 611-1 and in front of the second horizontal transporter 623. The first chute 625 is also located above the transition area between the first horizontal and vertical transporters 621 and 622. The first chute 625 is inclined with the front located above (i.e., the rear located below). The first chute 625 guides the coins ejected from the first container 611-1 obliquely rearward. The coins guided to the first chute 625 are put on the belt at the rear of the first horizontal transporter 621. The coins on the belt at the rear of the first horizontal transporter 621 are capable of easily engaging with the engagers of the belt.

The second chute 626 is interposed between the first chute 625 and the transition area between the first horizontal and vertical transporters 621 and 622. The second chute 626 is inclined with the front located above (i.e., the rear located below). The second chute 626 is parallel or substantially parallel to the first chute 625. The second chute 626 is longer than the first chute 625. The second chute 626 guides the coins having dropped from the front end of the third horizontal transporter 624 obliquely rearward. The coins guided to the second chute 626 are put on the belt at the rear of the first horizontal transporter 621. These coins engage with the engagers of the belt easily.

The front end of the second horizontal transporter 623 is more rearward than the transition area between the first horizontal and vertical transporters 621 and 622. The coins having dropped from the front end of the second horizontal transporter 623 are placed on the belt at the rear of the first horizontal transporter 621. These coins engage with the engagers of the belt easily.

The coins ejected from each container 611 engage with the engagers of the belt easily, which improves the transfer efficiency of the transport unit 62.

The housing 64 has an outlet 641 at its upper front. The outlet 641 is open horizontally in a side surface of the extension unit 6. As shown in FIG. 3, the outlet 641 is attached with a third chute 642. The third chute 642 guides the coins, which has been transported to the top in the housing 64 by the vertical transporter 622, to the outside of the housing 64 through the outlet 641.

The outlet 641 of the extension unit 6 is connected to an inlet 37 of the coin depositing and dispensing machine 3. The inlet 37 is open horizontally in a side surface of the coin depositing and dispensing machine 3. The inlet 37 is attached with a fourth chute 371 which is connected to the deposit unit 31. The coins sent out through the outlet 641 of the extension unit 6 pass through the inlet 37 and enter the deposit unit 31. The inlet 37 is another opening through which coins are inserted into the deposit unit 31. With the use of the inlet 37, the coins sent from the extension unit 6 are inserted into the deposit unit 31 without opening the shutter 312 of the inlet 311. The inlet 37 is an example of the "connector" connected to the extension unit 6.

As indicated by the two-dot chain lines in FIG. 4, the storage units 61 and the transport units 62 can be drawn forward from the housing 64. In order to charge each container 611 with coins, an operator draws the associated storage unit 61 and the associated transport unit 62 out of the housing 64. Once the storage unit 61 and the transport unit 62 are drawn out of the housing 64, the inlet 612 of the container 611 is exposed.

(Replenishment Procedure with Coins)

Next, replenishment of the coin depositing and dispensing machine 3 with coins using the extension unit 6 will be described. First, an operator manually charges the extension unit 6 with coins. The operator is a person in charge of a cash-in-transit (CIT) company, for example. In the processing of charging the extension unit 6 with coins, the operator draws out each storage unit 61 and the associated transport unit 62 of the extension unit 6 forward with a hand (see two-dot chain lines in FIG. 4). After that, the operator directly inserts coins into the associated container 611 through the associated inlet 612 open upward. The denominations of coins for charging the first, second, third, fourth, fifth, sixth, seventh, and eighth containers 611 are determined in advance. The operator inserts coins of a predetermined denomination into each container 611.

After completion of the insertion of the coins into the container 611, the operator pushes the storage unit 61 and the transport unit 62, which have been drawn out, into the housing 64. The processing of charging the extension unit 6 with coins is then complete. Here, the extension unit 6 include no recognition unit. The extension unit 6 cannot check the denomination and the number of coins used to charge each container 611. Information on the coins, that is, information on the denomination and the number of the coins used to charge is provided separately from the CIT company to the store. For example, the information may be transmitted from the server 7 to the terminal 4. Alternatively, a person in charge of the CIT company may manually input the information on the coins to the terminal 4. Alternatively, a person in charge of a store may manually input the information on the coins to the terminal 4. The terminal 4 manages information on the denominations and the numbers of coins stored in the first, second, third, fourth, fifth, sixth, seventh, and eighth containers 611 of the extension unit 6. More specifically, the terminal 4 manages the attachment position of each container 611 in the extension unit 6 in association with the information on the denomination and the number of coins stored in the container 611.

The terminal 4 manages the amount of coins stored in each stacker 341 of the coin depositing and dispensing machine 3, that is, the inventory amount of coins. The terminal 4 outputs a control signal to the extension unit 6, for example, when the inventory amount falls under a near empty. The control signal includes information on the denomination of the coins for the replenishment and the amount of replenishment. The amount of replenishment is set in advance in accordance with to the capacity of each stacker 341. The amount of replenishment is the amount for fully charging the stacker 341, for example.

If the replenishment with coins are scheduled, the terminal 4 outputs control signals on replenishment processing to the extension unit 6 in accordance with the schedule. The terminal 4 may output control signals to the extension unit 6 at predetermined times (e.g., 11:00, 14:00, 17:00, and 20:00). Alternatively, the terminal 4 may output control signals to the extension unit 6 at a predetermined time interval (e.g., every two hours or every four hours). In a store where a busy time in business hours of each day is predictable in advance, the time requiring a large amount of a change fund is predictable. In a store where change funds are periodically dispensed, the inventory amount in the coin depositing and dispensing machine 3 decreases over time at a constant rate. The coin depositing and dispensing machine 3 are replenished with coins in accordance with a predetermined schedule, which reduces the lacks of the coins to be dispensed by the coin depositing and dispensing machine 3.

The terminal 4 outputs a control signal on replenishment processing to the extension unit 6 in response to a manual operation of an operator. The operator replenishes the coin depositing and dispensing machine 3 with coins by a manual operation at any time. The operator may specify the amount of replenishment of the coin depositing and dispensing machine 3. The operator may specify the amount of replenishment for each denomination, for example. As the amount of replenishment, the operator may specify the number of coins used for the replenishment, for example.

A control signal on replenishment processing from the terminal 4 to the extension unit 6 is not limited to the replenishment with coins of one denomination, but may be related to replenishment with coins of a plurality of denominations.

Upon receipt of a control signal, the extension unit 6 executes the replenishment processing with coins. Specifically, the extension unit 6 drives the feeding unit 617 of one of the containers 611 storing the coins of the specified denomination. The extension unit 6 counts the number of coins passing through the outlet 616 and stops ejecting coins upon reaching the number of coins used for the replenishment, as instructed. The extension unit 6 may control the amount of ejected coins by adjusting the driving time of the feeding unit 617, for example. The extension unit 6 may also control the amount of dispensed coins based on the weight of the coins fed out of the container 611.

The coins fed out of the container 611 are put on the first, second, or third horizontal transporter 621, 623, or 624. With the transport unit 62 driven, the coins reach the vertical transporter 622 and are transported along the vertical transporter 622 to the top of the housing 64. The coins pass through the outlet 641 and the inlet 37 and enter the deposit unit 31 of the coin depositing and dispensing machine 3 (see the arrows in FIGS. 3 and 4).

The deposit unit 31 of the coin depositing and dispensing machine 3 feeds out the coins from the extension unit 6 one by one. The recognition unit 33 recognizes the coins. The transport unit 35 transports the recognized coins to the storage unit 34 which stores the coins in the stackers 341 associated with the denominations. The replenishment of the coin depositing and dispensing machine 3 with the coins using the extension unit 6 is then complete.

When the terminal 4 instructs the extension unit 6 to perform the replenishment with coins of a plurality of denominations, the extension unit 6 sequentially executes the replenishment with coins of the denominations.

The first cash handling machine 1 may additionally include not only one extension unit but also a plurality of extension units. As indicated by the one-dot chain line in FIG. 3, a second extension unit 60 may be further included together with the (first) extension unit 6.

The second extension unit 60) has the same configuration as the extension unit 6. The second extension unit 60 replenishes the coin depositing and dispensing machine 3 with coins as follows. First, the storage unit 61 of the second extension unit 60 feeds out coins used for the replenishment. The transport unit 62 of the second extension unit 60 transports the fed coins to the outlet 641. The coins pass through the outlet 641 of the second extension unit 60 and enter the extension unit 6.

The coins having entered the extension unit 6 are put on the transport unit 62 of the extension unit 6. The transport unit 62 transports the coins to the outlet 641 of the extension unit 6. The coins pass through the outlet 641 of the extension unit 6 and the inlet 37 of the coin depositing and dispensing machine 3 and enter the deposit unit 31. After that, the coin depositing and dispensing machine 3 stores the coins in the stackers 341 associated with the denominations. The replenishment of the coin depositing and dispensing machine 3 with coins using the second extension unit 60 and the extension unit 6 is then complete.

(Control Related to Replenishment)

As described above, the extension unit 6 is manually charged with coins. Accordingly, an erroneous insertion of a coin may occur. The term "erroneous insertion" means an insertion of the coins of a denomination different from that assigned to each container 611, into the container 611.

Since the extension unit 6 includes no recognition unit, the extension unit 6 cannot check the denomination of the coins stored in each container 611. The first cash handling machine 1 manages the attachment position of the container 611 in the extension unit 6 in association with information on the denomination and the number of coins stored in the container 611. In accordance with an instruction from the terminal 4, the extension unit 6 feeds coins from the container 611 supposed to contain coins of the specified denomination, and sends the coins to the coin depositing and dispensing machine 3. Only by the recognition of the coins used for the replenishment by the recognition unit 33 of the coin depositing and dispensing machine 3, an erroneous insertion of a coin is clarified.

Here, a coin of a denomination different from that specified is sent to the coin depositing and dispensing machine 3. Since this is an error, a conventional machine stops the replenishment processing. However, the replenishment processing with coins may be performed in an unmanned manner. It is disadvantageous if the first cash handling machine 1 remains stopped by the stop of the replenishment processing.

If none of the CIT company, which is authorized for the coins stored in the extension unit 6, may be present in the execution of the replenishment processing. In this case, it is disadvantageous to take out, to the outside of the machine, the coins being used to replenish the coin depositing and dispensing machine 3 from the extension unit 6 due to the error.

To address the problem, the money handling machine 10 continues the replenishment processing without interruption, even if a coin with a denomination different from the specified denomination is used for the replenishment.

Figure 5:
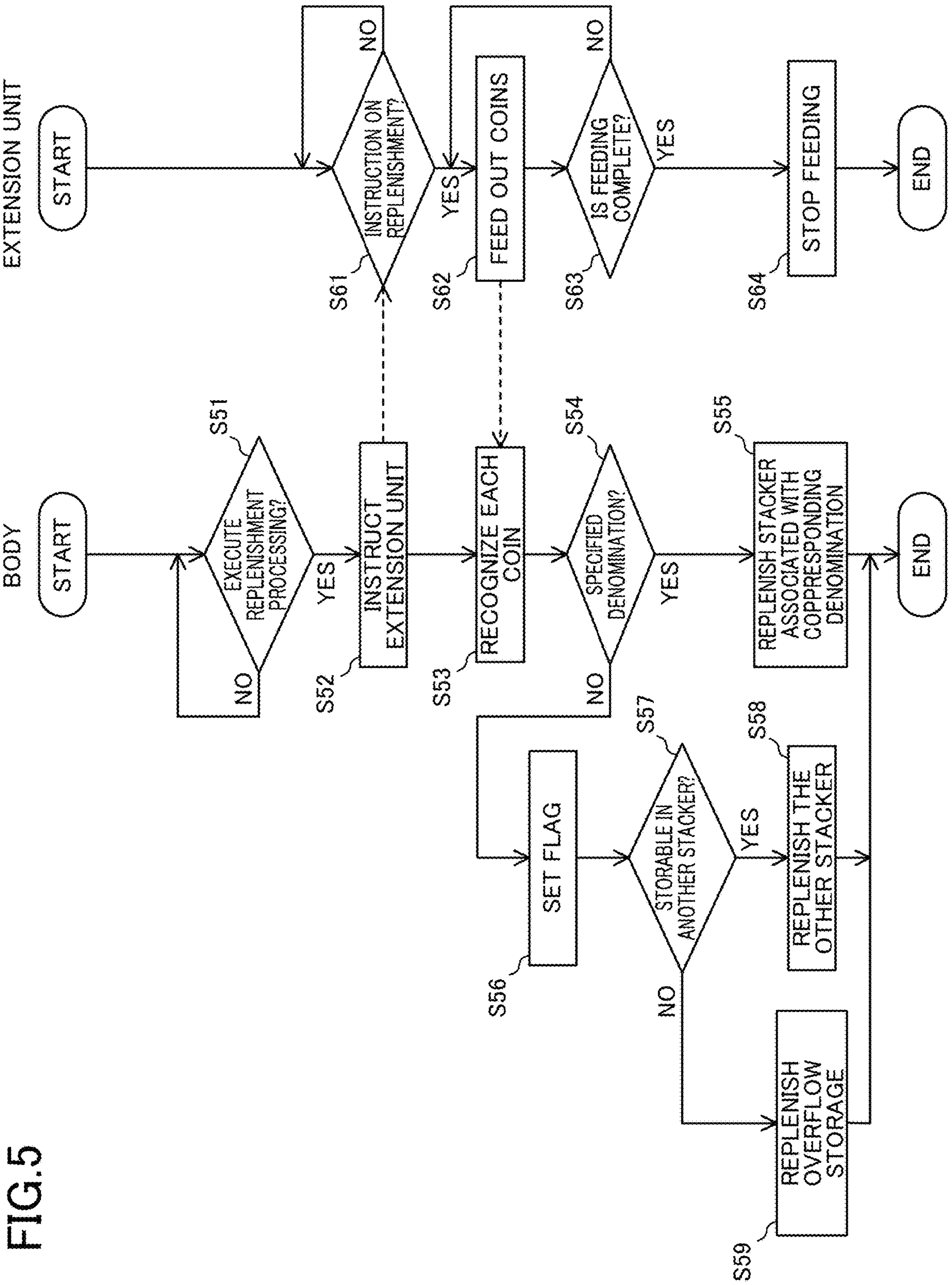
FIG. 5 is a flowchart related to replenishment processing.

FIG. 5 illustrates a procedure of replenishment processing with coins by the money handling machine 10. First, in step S51 after the start, the body of the money handling machine 10 including the coin depositing and dispensing machine 3 and the terminal 4 determines whether to execute the replenishment processing. As described above, the coin depositing and dispensing machine 3 may execute the replenishment processing automatically or in accordance with a manual instruction by an operator. If the determination in step S51 is NO, the process repeats step S51. If the determination in step S51 is YES, the process proceeds to step S52.

In step S52, the body instructs the extension unit 6 to execute the replenishment processing. The body assigns the denomination of coins used for the replenishment and the amount of replenishment.

On the other hand, in step S61 after the start, the extension unit 6 first determines whether an instruction has been received from the body. If no instruction has been received, the process repeats step S61. If an instruction has been received, the process proceeds to step S62. In step S62, the extension unit 6 feeds out coins of the specified denomination.

As described above, the coins from the extension unit 6 are inserted into the deposit unit 31 of the coin depositing and dispensing machine 3. The deposit unit 31 feeds out the deposited coins. In step 553, the recognition unit 33 recognizes each coin. In step S54, the body determines whether the recognized coin is of the specified denomination as a result of the recognition. If the recognized coin is of the specified denomination, the process proceeds to step S55. The coin depositing and dispensing machine 3 stores the coin in the stacker 341 associated with the corresponding denomination, that is, the first storage unit.

In step S63, the extension unit 6 determines whether the feeding of the specified amount is complete. If the feeding is not complete, the process returns to step S62 so that the extension unit 6 continues feeding out coins. After completion of the feeding of the specified amount, the process proceeds to step S64 so that the extension unit 6 stops feeding out coins.

Assume that any coin with a denomination different from that specified is sent to the coin depositing and dispensing machine 3 in step S54 unlike in the first case where a coin with the specified denomination is used for the replenishment. The process then proceeds to step S56. In step S56, the body sets a flag. This flag indicates that the extension unit 6 is erroneously charged with a coin. In accordance with the flag, the terminal 4 makes a notification through the display unit 42. The display unit 42 may notify of information specifying the container 611 with an erroneous insertion. A person in charge of the store who has seen the notification may notify the CIT company, if the CIT company is authorized for the extension unit 6, for example. A person in charge of the CIT company who has received the notification checks the container 611 with the erroneous insertion based on the flag. The display unit 42 is an example for the "notification unit" whose configuration is not limited thereto. For example, the notification may be made to another terminal held by the administrator via a network.

At the time of the check, the person in charge may perform reconciliation processing of the coins in the container 611 using the coin depositing and dispensing machine 3. Specifically, the person in charge inserts the coins in the container 611 with a hand into the deposit unit 31 of the coin depositing and dispensing machine 3. The recognition unit 33 recognizes the denomination of the coins inserted into the deposit unit 31. The person in charge corrects the denominations of the coins stored in the containers 611 of the extension unit 6.

When the person in charge of the store is identical to the person authorized for the extension unit 6, the person in charge of the store himself/herself may open the extension unit 6 and check each container 611.

In step S57 subsequent to step S56, the body determines whether a coin of a denomination different from that specified is storable in another stacker 341. The other stacker 341 may be, for example, the stacker 341 storing the coins with the corresponding denomination. The expression "storable in another stacker 341" also means that this stacker 341 has space. Assume that no stacker 341 for storing the coins with the corresponding denomination exists, or a stacker 341 for storing the coins of the associated denomination exists but has no space. In each case, the determination in step S57 is NO and the process proceeds to step S59. If a stacker 341 for storing the coins with the corresponding denomination exists and has space, the determination in step S57 is YES and the process proceeds to step S58.

In step S58, the coin depositing and dispensing machine 3 replenishes the other stacker 341 with the coin. The other stacker 341 corresponds to the second storage unit. In step S59, the coin depositing and dispensing machine 3 replenishes the overflow storage 343 with the coin. The overflow storage 343 corresponds to the third storage unit.

In this manner, a coin with a denomination other than the specified one is sent to the coin depositing and dispensing machine 3. In this second case, the extension unit 6 continues feeding out the coins according to a control signal from the terminal 4. The coin depositing and dispensing machine 3 continues the replenishment with coins. Accordingly, the first cash handling machine 1 takes out no coin with an incorrect denomination. The first cash handling machine 1 is advantageous in completing the replenishment processing and continuing the subsequent processing, even if there is no authorized person for coins used for the replenishment in the replenishment processing.

Here, when the flag is set in step S56, the coin depositing and dispensing machine 3 and the extension unit 6 may execute the processing of checking the respective denominations of the coins stored in the containers 611. Specifically, the extension unit 6 feeds out a small amount of the stored coins from each container 611 and sends the coins to the coin depositing and dispensing machine 3. The recognition unit 33 of the coin depositing and dispensing machine 3 recognizes the coins sent from the extension unit 6. The money handling machine 10 manages the information on the container 611 feeding out the coins in association with the information on the denomination of the coins. Accordingly, the money handling machine 10 accurately manages the denominations of the coins stored in the containers 611 of the extension unit 6. The coin depositing and dispensing machine 3 may store the coins fed out from the respective containers 611 in the stackers 341 associated with the denominations. Since the small amount of coins is fed out, the stacker 341 stores the coins even if there is little space. The coin depositing and dispensing machine 3 may store the coins fed out from the container 611 into the overflow storage 343.

When the flag is set in step S56, the money handling machine 10 may rewrite the correspondence information between the containers 611 and the denominations of the coins, which is the managed correspondence information. A person in charge of the store or a person in charge of the CIT company may rewrite the correspondence information between the containers 611 and the denominations of the coins by operating the display unit 42 of the terminal 4. The person in charge of the CIT company may also use the server 7 to rewrite the correspondence information managed by the money handling machine 10.

If coins of different denominations are stored in one container 611, the denomination of the coins fed out of the container 611 may be changed during the replenishment processing. In this case, the money handling machine 10 may stop the replenishment processing with the change regarded as an error.

(Second Control Example)

Figure 6:
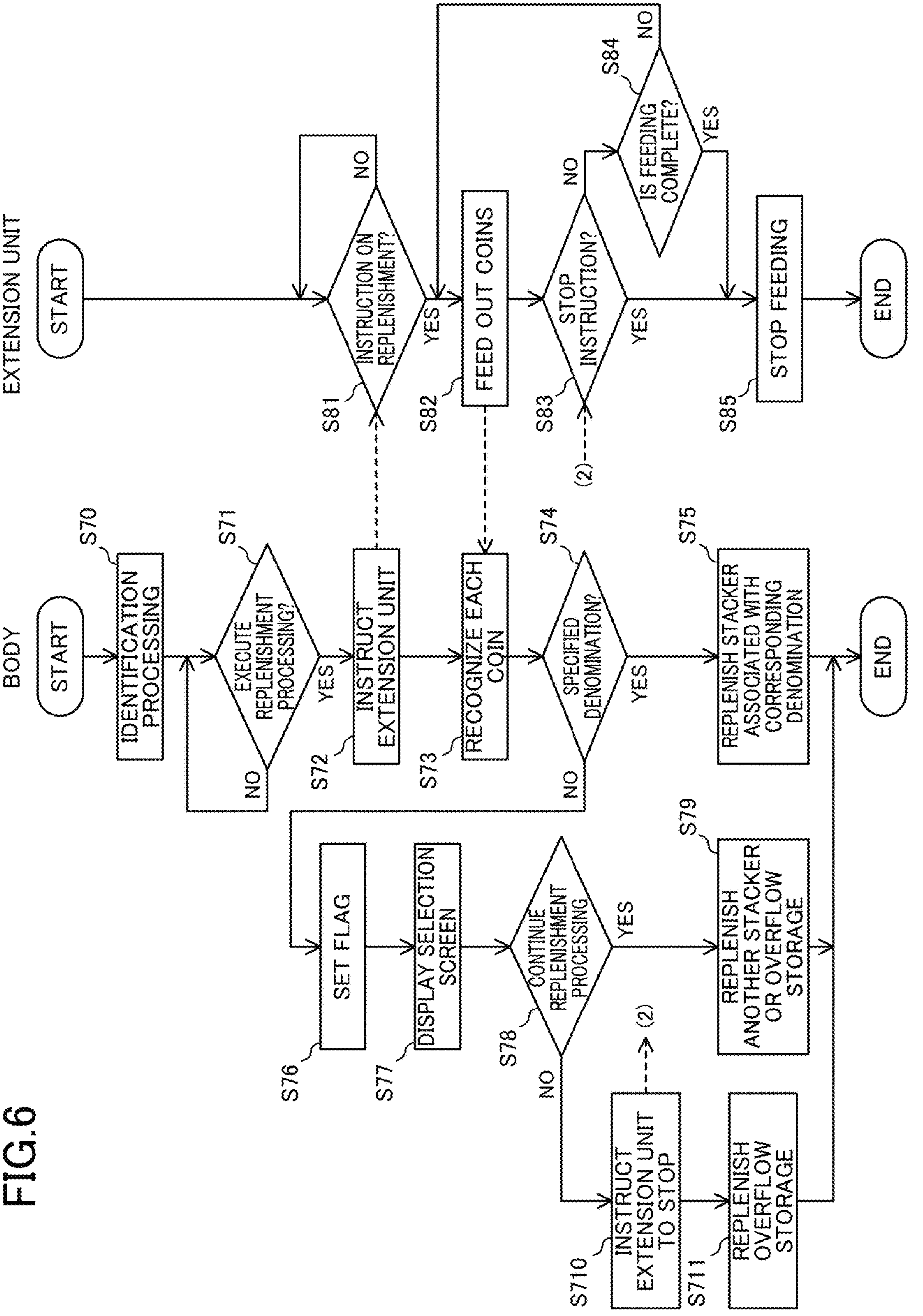
FIG. 6 is a flowchart related to a variation of the replenishment processing.
Figure 8A:
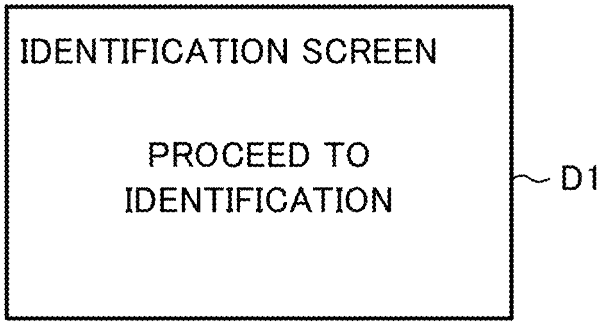
FIGS. 8A, 8B, 8C, and 8D are examples of a display screen.

FIG. 6 is a flowchart showing a second control example. This control example corresponds to a case where the operator manually executes the replenishment processing. First, in step S70 after the start, the body of the money handling machine 10 performs identification processing. For example, the control unit 41 of the terminal 4 displays an identification screen D1 as shown in FIG. 8A. The operator performs an identification operation, for example, using an ID card or by inputting a personal recognition number. The terminal 4 may identify the operator by a biometric technique.

Figure 8B:
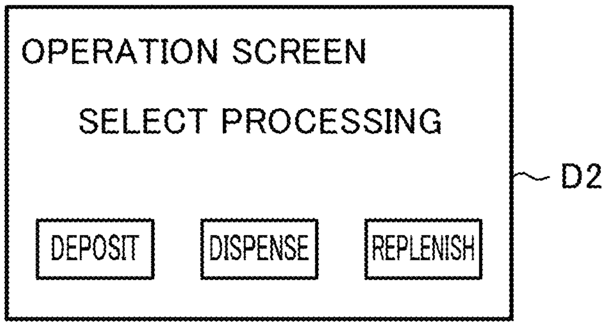
Figure 8C:
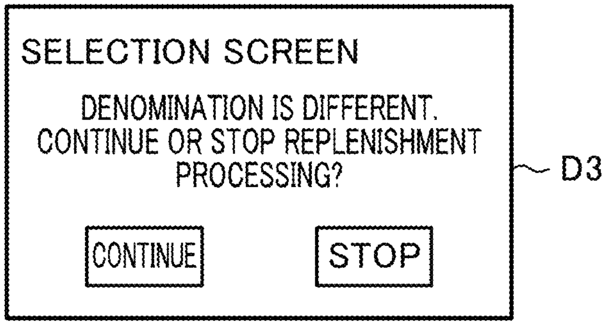

Once the identification is performed, the display unit 42 of the terminal 4 displays an operation screen illustrated in FIG. 8B. The operator selects desired processing on the operation screen. In selecting the replenishment processing, the operator specifies at least the denomination of coins used for the replenishment. The operator may further specify the amount of replenishment.

In step S71, the body determines whether the replenishment processing is selected. If the determination in step S71 is NO, the process repeats step S71. If the determination in step S71 is YES, the process proceeds to step S72. Although not included in this flow, the cash handling machine 1 executes the depositing or dispensing processing, if the operator selects depositing or dispensing processing.

In step S72, the body instructs the extension unit 6 to execute the replenishment processing. The body assigns the denomination of coins used for the replenishment and the amount of replenishment.

First, in step S81 after the start, the extension unit 6 determines whether an instruction has been received from the body. If no instruction has been received, the process repeats step S81. If an instruction has been received, the process proceeds to step S82. In step S82, the extension unit 6 feeds out coins of the specified denomination.

As described above, the fed coins are inserted into the deposit unit 31 of the coin depositing and dispensing machine 3. The deposit unit 31 then feeds out the inserted coins. In step S73, the recognition unit 33 recognizes the coins. In step S74, the body determines whether the denomination of the recognized coins is identical to the specified denomination as a result of the recognition. If the denomination of the recognized coins is identical to the specified denomination, the process proceeds to step S75. The coin depositing and dispensing machine 3 stores the coins in the storage area associated with the corresponding denomination, that is, the first storage unit.

Assume that any coin with a denomination different from that specified is sent to the coin depositing and dispensing machine 3 in step S74 unlike in the first case where a coin with the specified denomination is used for the replenishment. The process then proceeds to step S76. In step S76, the body sets a flag.

In subsequent step S77, the display unit 42 of the terminal 4 displays a selection screen. FIG. KC illustrates a selection screen D3. The selection screen D3 display the fact that the recognized denomination is different from that specified, and buttons for selecting to continue or stop the replenishment processing. An operator selects to continue or stop.

If continuation is selected, the process proceeds from step S78 to step S79. If stop is selected, the process proceeds from step S78 to step S710. In step S79, the coin depositing and dispensing machine 3 stores the coin in the stacker 341 storing the coins with the corresponding denomination or the overflow storage 343. As in the control described above, the coin depositing and dispensing machine 3 stores the coin in the stacker 341 for storing the coins with the corresponding denomination, if such the stacker 341 exists and has space. If no stacker 341 for storing the coins with the corresponding denomination exists or if the associated stacker 341 has no space, the coin may be stored in the overflow storage 343. The operator may select the storage destination of the coin.

On the other hand, in step S710, the body instructs the extension unit 6 to stop the replenishment processing.

In step S83, the extension unit 6 determines whether a stop instruction has been received from the body. If no stop instruction has been received, the process proceeds to step S84. If a stop instruction has been received, the process proceeds to step S85 so that the extension unit 6 stops feeding out the coins.

In step S711 before the stop instruction, the coin depositing and dispensing machine 3 stores, in the overflow storage 343, the coins fed out from the containers 611 and sent to the coin depositing and dispensing machine 3. The coin depositing and dispensing machine 3 may store the coins in the stackers 341 associated with the corresponding denominations.

In step S84, the extension unit 6 determines whether the feeding of the specified amount is complete. If not complete, the process returns to step S82 so that the extension unit 6 continues feeding coins. After completion of the feeding of the specified amount, the process proceeds to step S85 so that the extension unit 6 stops the feeding of coins.

With this configuration, the money handling machine 10 is switchable between continuation and stop of replenishment as selected by the operator upon finding of an incorrect denomination.

(Third Control Example)

Figure 7:
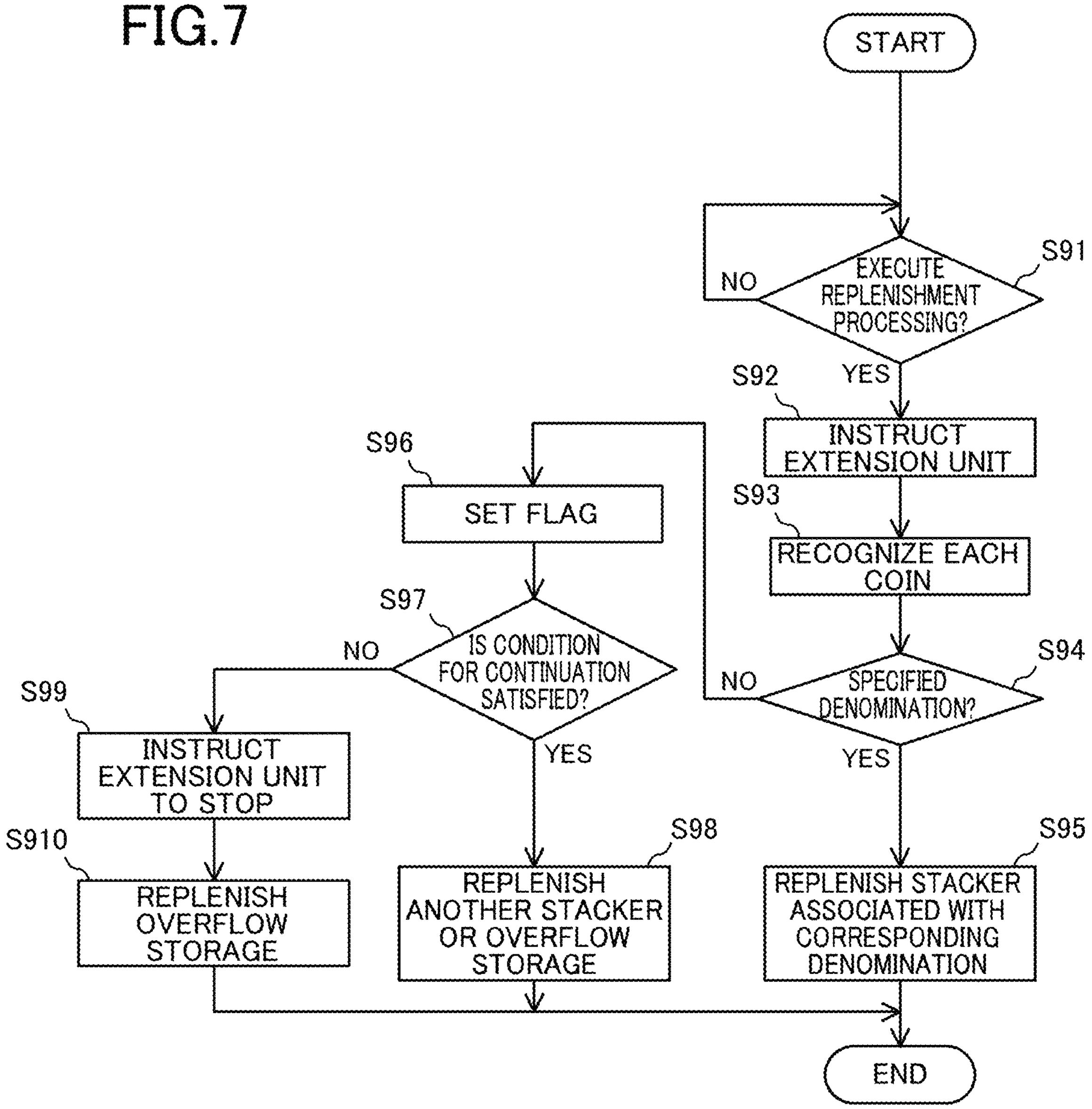
FIG. 7 is a flowchart related to a variation of the replenishment processing.

FIG. 7 is a flowchart showing a third control example. In this control example, the money handling machine 10 is switchable between continuation and stop of the replenishment processing under a condition. The control procedure of the extension unit 6 according to the third control example is the same as in the flowchart of FIG. 6.

First, in step S91, the body determines whether to execute the replenishment processing. As described above, the money handling machine 10 may execute the replenishment processing automatically and in accordance with a manual operation by an operator. If the replenishment processing is executed in accordance with the manual operation of the operator, the operator is identified, which is omitted in the flow of FIG. 9.

If the determination in step S91 is NO, the process repeats step S91. If the determination in step S91 is YES, the process proceeds to step S92.

In step S92, the body instructs the extension unit 6 to execute the replenishment processing. The body assigns the denomination of the coins used for the replenishment and the amount of replenishment. The extension unit 6, which has received the instruction, sends the coins of the specified denomination to the coin depositing and dispensing machine 3 (see step S82 in FIG. 6).

In step S93, the recognition unit 33 recognizes the coins sent from the extension unit 6. In step S94, the body determines whether the recognized coins are of the specified denomination as a result of the recognition. If the recognized coins are of the specified denomination, the process proceeds to step S95. The coin depositing and dispensing machine 3 stores the coins in the stacker 341 associated with the corresponding denomination, that is, the first storage unit.

Assume that any coin of a denomination different from that specified is sent to the coin depositing and dispensing machine 3 in step S94 unlike in the first case where a coin of the specified denomination is used for the replenishment. The process then proceeds to step S96. In step S96, the body sets a flag.

In subsequent step S97, the body determines whether a condition for continuing the replenishment processing is satisfied. The condition is at least one of the following.

(1) The money handling machine 10 automatically makes an instruction on the replenishment processing based on a preset schedule. This is regarded as a satisfaction of a condition for continuing the replenishment processing. This is because there is not always anyone authorized to open the extension unit 6 and completion of the replenishment processing is advantageous. The money handling machine 10 instructs the replenishment processing by a manual operation of an operator. This is regarded as a non-satisfaction of a condition for continuing the replenishment processing. The replenishment processing thus stops.

(2) The replenishment processing is executed in response to an instruction by a manual operation of an operator who is authorized for the coins stored in the extension unit 6. This is regarded as a non-satisfaction of a condition for continuing the replenishment processing. The replenishment processing thus stops. This is because the operator can open the extension unit 6 to check the denominations of the coins stored in the containers 611. The operator is not authorized. This is regarded as a satisfaction of a condition for continuing the replenishment processing. This is because the coins cannot be taken out of the machine.

Figure 8D:
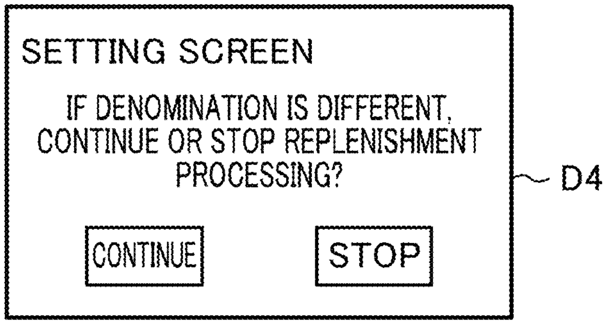

(3) Non-continuation of the replenishment processing at an erroneous insertion is set in advance. This is regarded as a non-satisfaction of a condition for continuing the replenishment processing. The replenishment processing thus stops. For example, on a setting screen D4 illustrated in FIG. 8D, an administrator of the cash handling machine 1 may set whether to continue or stop in advance.

In step S97, if the continuation condition is satisfied, the process proceeds to step S98. If the continuation condition is not satisfied, the process proceeds to step S99.

In step S98, the coin depositing and dispensing machine 3 stores the coin in the stacker 341 storing the coins with the corresponding denomination or the overflow storage 343. As in the control described above, the coin depositing and dispensing machine 3 stores the coin in the stacker 341 for storing the coins with the corresponding denomination, if such the stacker 341 exists and has space. If no stacker 341 for storing the coins with the corresponding denomination exists or if the associated stacker 341 has no space, the coin may be stored in the overflow storage 343. The operator may select the storage destination of the coin.

In step S99, the body instructs the extension unit 6 to stop the replenishment processing. The extension unit 6, which has received the stop instruction, stops feeding the coins (see steps S83 and S85 in FIG. 6).

In step S910 before the stop instruction, the coin depositing and dispensing machine 3 stores, in the overflow storage 343, the coins fed out of the containers 611 to the coin depositing and dispensing machine 3. The coin depositing and dispensing machine 3 may store the coins in the stackers 341 associated with the corresponding denominations.

With this configuration, the money handling machine 10 is switchable between continuation and stop of replenishment under various conditions.

Note that the technique disclosed herein is not limited to the application to the machines illustrated in FIGS. 1 to 4 and 9. The technique disclosed herein is applicable to money handling machines with various configurations. For example, the technique disclosed herein is applicable to a money handling machine including the coin depositing and dispensing machine 3 and the extension unit 6. That is, the terminal 4 may be omitted. In addition, the technique disclosed herein is applicable to a money handling machine including the banknote depositing and dispensing machine 2 and an extension unit for replenishment with banknotes.

In the flowcharts illustrated in FIGS. 5 to 7, the order of steps may be changed or some of the steps may be executed in parallel. In addition, some of the steps may be omitted or another step may be added.

The plurality of controls described above may be combined as appropriate.

What is claimed is:

1. A money handling method to be executed by a money handling machine including a body and an extension unit that is configured to store money to be used to replenish the body depending on denominations and that is connected to the body, the money handling method comprising:
- instructing the extension unit with an instruction to replenish the body with money with a specified denomination;
- replenishing the body with the money from the extension unit in accordance with the instruction;
- recognizing a denomination of each of the money replenished to the body;
- storing the money in a first storage associated with a first denomination in a first case that the denomination recognized is the first denomination identical to the specified denomination; and
- in a second case that the denomination recognized is a second denomination different from the specified denomination:
  - storing the money in a second storage;
  - continuing replenishment with the money using the extension unit as instructed in a case that the replenishment with the money is automatically executed based on a preset schedule; and
  - stopping the replenishment with money using the extension unit in a case that an instruction on the replenishment with the money has been manually issued by an operator.

2. The money handling method of claim 1, wherein the second storage is associated with the second denomination.

3. The money handling method of claim 2, further comprising:
- storing the money in a third storage in a case that there is no storage associated with the second denomination or no space in the second storage in the second case.

4. The money handling method of claim 1, further comprising:
- making a notification using a notifier in the second case.

5. The money handling method of claim 4, further comprising:
- notifying of information on a storage storing the money with the second denomination in the extension unit using the notifier.

6. The money handling method of claim 1, further comprising:
- stopping the replenishment from the extension unit at a satisfaction of a specific condition in the second case.

7. The money handling method of claim 6, wherein the specific condition is the presetting in which a stop of the replenishment in the second case.

8. The money handling method of claim 6, further comprising:
- identifying the operator;
- stopping the replenishment in a case that the operator is an authorized person for the money stored in the extension unit; and
- continuing the replenishment in a case that the operator is not the authorized person.

9. The money handling method of claim 6, further comprising:
- storing the money sent from the extension unit in a storage different from the first storage and the second storage at a stop of the replenishment.

10. The money handling method of claim 6, further comprising:
- instructing the extension unit to replenish the body with money with a next denomination after stopping the replenishment.

11. The money handling method of claim 1, further comprising:
- notifying the operator to select to continue or stop the replenishment in the second case;
- storing the money in the second storage and continuing the replenishment by the extension unit as instructed in a case that the operator selects to continue the replenishment; and
- stopping the replenishment from the extension unit in a case that the operator selects to stop the replenishment.

12. The money handling method of claim 11, further comprising:
- displaying a selection screen using a display in the second case.

13. The money handling method of claim 1, further comprising instructing the extension unit to replenish based on an instruction manually issued by the operator.

14. A money handling machine, comprising:
- at least a first storage and a second storage that store money with respective denominations;
- a connector connected to an extension unit which stores money with respective denominations;
- a receiver that receives money used for replenishment from the extension unit;
- a recognition circuit that recognizes a denomination of each of the money sent from the extension unit; and
- a controller that sends, to the extension unit, an instruction on replenishment with money with a specified denomination, and causes the first storage or the second storage to store the money depending on the denomination recognized by the recognition circuit, wherein the first storage is associated with a first denomination and stores money in a first case that the denomination recognized is the first denomination identical to the specified denomination, and in a second case that the denomination recognized is a second denomination different from the specified denomination:

the second storage stores the money, the controller continues replenishment with the money by the extension unit as instructed in a case that the replenishment with the money is automatically executed based on a preset schedule, and the controller stops the replenishment with money using the extension unit in a case that an instruction on the replenishment with the money has been manually issued by an operator.

15. The money handling machine of claim 14, wherein a notifier that notifies of information is connected to the money handling machine, and the controller causes the notifier to make a notification in the second case.

16. The money handling machine of claim 14, further comprising:

the extension unit which includes:

one or more storages which store the money with respective denominations;

a transporter;

a control circuit; and a housing which houses the one or more storages, the transporter and the control circuit, wherein the transporter includes a first horizontal transporter at a bottom of the housing and a vertical transporter at a front of the housing.

17. The money handling machine of claim 16, wherein the transporter further includes a second horizontal transporter and a third horizontal transporter, the second horizontal transporter extends in a direction perpendicular to the first horizontal transporter, and the third horizontal transporter extends along a front to rear direction of the housing.

18. The money handling machine of claim 17, wherein the third horizontal transporter extends below at least one storage of the one or more storages.

19. The money handling machine of claim 14, wherein the controller is further configured to control replenishment with money by the extension unit based on an instruction manually issued by the operator.

* * * * *